April 14, 1970

D. W. NESTOR 3,506,906

GROUND FAULT CIRCUIT INTERRUPTER WITH
INADVERTENT GROUND SENSOR
Filed Dec. 18, 1967

INVENTOR.
DAVID WILLIAM NESTOR
BY
Lothrop & West
ATTORNEYS

United States Patent Office 3,506,906
Patented Apr. 14, 1970

3,506,906
GROUND FAULT CIRCUIT INTERRUPTER WITH INADVERTENT GROUND SENSOR
David William Nestor, Oakland, Calif., assignor to The Rucker Company, a corporation
Filed Dec. 18, 1967, Ser. No. 691,371
Int. Cl. H02h 1/02, 3/28
U.S. Cl. 321—18                                7 Claims

ABSTRACT OF THE DISCLOSURE

A circuit breaker is installed between a source having a neutral conductor and a load and is operated when a differential transformer senses that more current is flowing into the load from the source through the conductors that is flowing back to the source through the conductors. A power transformer is across the neutral conductor and a load conductor and has in its magnetic field a winding for inducing a small voltage between the neutral conductor and ground to sense an inadvertent grounding of the neutral conductor at or near the load.

---

Figure 1:
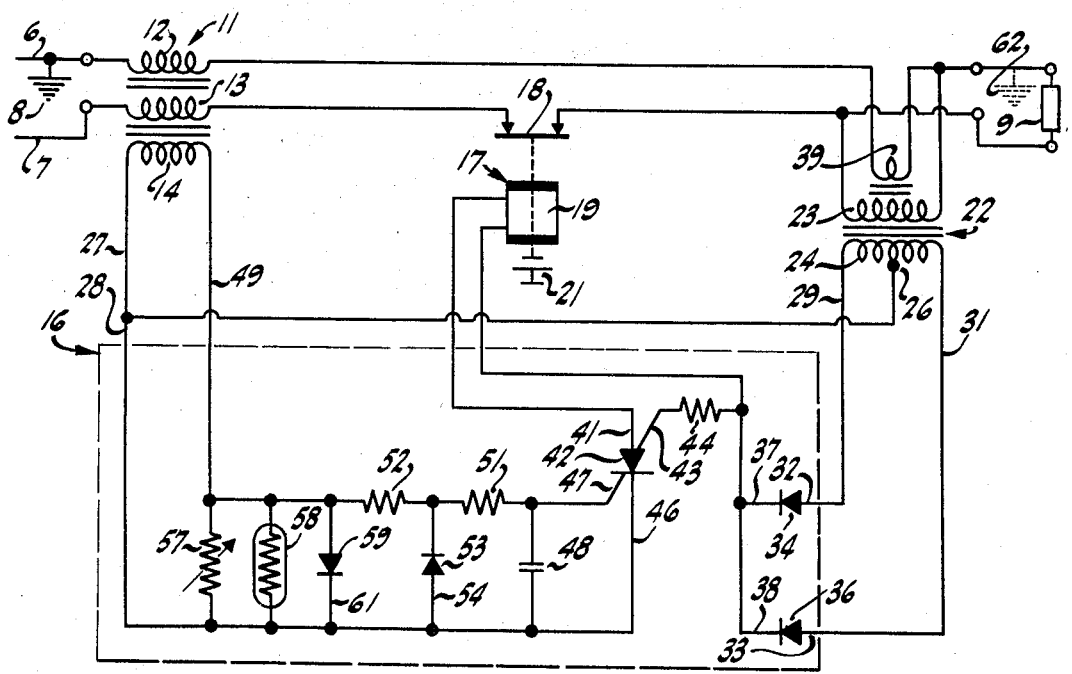

The invention relates to means for preventing bodily harm or fire from an electrical circuit and is particularly concerned with circuit breaking apparatus in which a circuit breaker is operated in response to means capable of sensing when more electrical current is flowing into an electrical load through the conductors from a source than is returning to the source through the conductors. A circuit of this character is found in the patent to C. F. Dalziel No. 3,213,321 dated Oct. 19, 1965.

In circuits of the character of the Dalziel patent the presence of a fault from one of the electrified conductors to ground somewhere in the load, which could be caused by a person receiving a shock or from electrical leakage capable of causing a fire, is sensed by a suitable detector such as a differential transformer connected so that all of the conductor currents from the source pass through its primaries. The secondary of the differential transformer will then have a current when the total current flowing one way through the transformer does not equal the total current flowing the other way therethrough. This apparatus will work less effectively, if at all, however, when there is a path other than the primaries of the differential transformer by which current may flow from the source to the load and return. Such may easily be the case.

In the normal wiring of a house, for example, one of the conductors from the alternate circuit source is generally grounded where it enters the house. This conductor becomes the neutral one and the other conductors are electrified with varying voltages with respect to it. The grounding of the neutral conductor somewhere within the load will then provide an alternate path for current to and from the load by which current can by-pass the differential transformer through ground, and the differential transformer may sense a fault when none exists since some of the current flowing back to the source need not pass through it. Alternatively, the differential transformer may not sense a fault as quickly, or at all, when one does exist because some of the current which would normally pass from the fault back to the source through ground can get back into the differential transformer through the place in the load where the neutral is grounded. Such a grounding of the neutral at the load can readily occur, as where the conducting jacket of an appliance is attached to the neutral conductor, a common practice, and the jacket in turn touches a water pipe, a gas pipe, etc.

It is therefore an object of the invention to provide a differential circuit breaker with means for detecting a grounding of the neutral conductor at the load.

Another object of the invention is to provide a differential circuit breaker with means for operating the circuit breaker therein when the neutral conductor is grounded at the load.

Still another object of the invention is to provide a generally improved differential circuit breaker.

Figure 2:
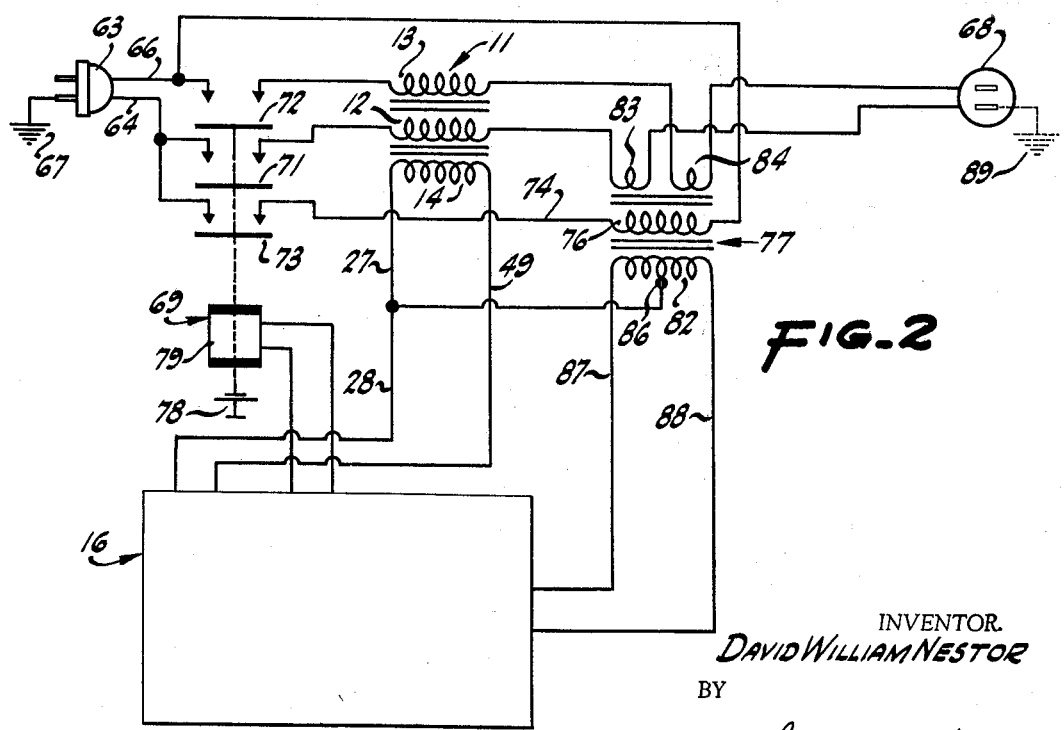

Other objects together with the foregoing are attained in the embodiment of the invention described in the accompanying description illustrated in the accompanying drawing, in which:

FIGURE 1 is a circuit diagram of a differential circuit breaker embodying the invention for permanent installation in a house, a factory, or the like, shown with the circuit breaker closed; and FIGURE 2 is a circuit diagram of a portable differential circuit breaker embodying the invention which may be plugged into a conventional receptacle in series with a particular appliance to be protected, the box representing the circuit shown in the dashed-line box in FIGURE 1, and the circuit breaker being shown in the open position.

FIGURE 1

The circuit of FIGURE 1 is described as installed in a house; however, it should be understood that it may equally well be installed in a factory or in any other place, such as the lighting circuit for a swimming pool, where the installation is permanent and where the neutral conductor is known. While a two-wire system is shown and described, the system is equally applicable to installations having three or more wires and having more than one phase.

In FIGURE 1, the alternating current power is supplied from a source (not shown) by a pair of conductors 6 and 7. The conductor 6 is the neutral conductor, and it is conventionally connected to an electrical ground 8 as it enters the house (not shown). The electrified conductor 7 thus carries an alternating voltage with respect to the neutral conductor 6. Connected between the source and the remaining wiring or load 9 of the house is the circuit breaking apparatus of the present invention.

Acting as a fault sensing means for the circuit breaking apparatus is a differential transformer 11 connected so that each conductor 6 and 7 must continue through a respective one of two substantially identical primaries 12 and 13 thereof on its way to the load 9. The differential transformer is so designed that a current will be generated therein and a voltage will appear across the secondary circuit of the network 16 only when the currents in the primaries are not equal and opposite. As more fully described below, a network 16 then responds to such a current source in the secondary 14 and operates to open a circuit breaker 17 connected in series with the load 9. The electrified conductor 7 includes a contact bar 18 in the circuit breaker which is operated by a coil 19. When activated the coil 19 opens the contact bar and leaves the contact bar open after deactivation. The contact bar may then only be closed manually by a push button 21 or the like.

The operating network 16 receives its power through a power transformer 22. The power transformer has a primary 23 connected from the electrified conductor 7 to the neutral conductor 6 on the side of the circuit breaker 17 having the load 9. The secondary 24 of the power transformer is centertapped and the centertap 26 is connected to one side 27 of the secondary 14 of the differential transformer 11 to form a common terminal 28. Each of the two sides 29 and 31 of the first secondary of the power transformer is connected to an anode 32 or 33 of one of a pair of diodes 34 and 36. The cathodes 37 and 38 of the diodes are connected to each other to form a full-wave rectifier with the common terminal 28. A series voltage source is interposed in the conductor 6 between the transformer 11 and the load 9. This takes the form of a tertiary winding 39 of the power transformer. This is connected so that the neutral conductor 6 continues through the tertiary winding 39 in series with the load. Usually the conductor 6 is simply passed through a winding space window in the transformer core providing a complete turn.

The cathodes 37 and 38 of the diodes 34 and 36, serving as the output of the full-wave rectifier, are connected to the anode 41 of a silicon controlled switch 42 through the coil 19 of the circuit breaker 17 and to the anode gate 43 of the silicon controlled switch through a biasing resistor 44. The cathode 46 of the silicon controlled switch is connected to the common terminal 28 directly; however, the cathode gate 47 of the silicon controlled switch is connected to the common terminal through a capacitor 48 and to the other side 49 of the secondary 14 of the differential transformer 11 through a pair of resistors 51 and 52 in series. The junction between the resistors 51 and 52 is connected to the common terminal through a diode 53 oriented with its anode 54 connected to the common terminal, while the other side 49 of the secondary of the differential transformer is connected to the common terminal by a parallel combination of a variable resistor 57, a thermistor 58 and a diode 59 oriented with its cathode 61 connected to the common terminal.

OPERATION OF FIGURE 1

The present device is primarily intended to protect people against harm from electrical shock. With the circuit breaker 17 in its closed position, current flows along the electrified conductor 7 through the primary 13 of the differential transformer 11, the contact bar 18 of the circuit breaker 17, the primary 23 of the power transformer 22 and the load 9 in parallel, the tertiary winding 39 of the power transformer 22, and the primary 12 of the differential transformer 11 to the neutral conductor 6. In the normal case no current will enter or leave the load by any path other than the primaries 12 and 13 of the differential transformer so the currents in these primaries will be equal and opposite and no control current will appear in the network 16. Accordingly no voltage will appear between the cathode gate 47 and the cathode 46 of the silicon controlled switch 42, rendering the silicon controlled switch in its off state so that it will not conduct current between its anode 41 and its cathode 46. Thus no current will pass through the coil 19 of the circuit breaker 17 and the circuit breaker will remain closed.

If the electrified conductor 7 becomes grounded by a fault at the load 9, as would occur if a person were receiving a shock or if a leakage were present, more current would pass through the primary 13 than would pass back through the primary 12 since this new ground would provide a path in addition to the primary 12 for the current returning to the source through the neutral conductor 6. An alternating current and voltage would thus appear at the secondary winding 14. During the portion of the alternating cycle when the voltage at the conductor 49 is positive with respect to the common terminal 28, current will flow to the terminal 28 through the parallel paths containing the resistor 57, the thermistor 58, the diode 59, and the path composed of the resistors 52 and 51, and the capacitor 48. A voltage will appear across the capacitor 48 such that the cathode gate 47 of the silicon controlled switch 42 is positive with respect to the cathode 46 thereof. Current flow through the diode 59 is extremely small until the voltage appearing across it is above its conduction threshold. When the conduction threshold of the diode 59 is exceeded, most of the current flowing in the conductor 49 is shunted around the other parallel paths to the terminal 28, through the diode 59, thus preventing the positive excursion of voltage at the cathode gate 47 from reaching a value which could damage the silicon controlled switch 42, but allowing the voltage at the cathode gate 47 to reach a value sufficient for reliable triggering of the silicon controlled switch 42.

If the gate 47 is thus made sufficiently positive to exceed the threshold value of the switch 42, the switch 42 is turned on and permits power from the diodes 34 and 36 to flow through the coil 19 of the circuit breaker 17, opening the circuit breaker and disconnecting both the load and the network 16 from the source until the circuit breaker is manually reset by the push button 21.

The second portion of the alternating cycle is not used for triggering the silicon controlled switch 42. During the second portion, when the voltage appearing on the conductor 49 is negative with respect to the common terminal 28, current will flow from the common terminal 28 to the conductor 49 through the parallel paths containing the resistor 57, the thermistor 58, the diode 53, and the path composed of the capacitor 48, the resistor 51 and the resistor 52. A voltage will appear across the capacitor 48 such that the cathode gate 47 of the silicon controlled switch 42 is negative with respect to the cathode 46 thereof. When the voltage across the diode 53 exceeds its threshold voltage, most of the current flowing from the terminal 28 to the conductor 49 will pass through the diode 53, preventing the negative voltage appearing on the cathode gate 47 with respect to the cathode 46 from exceeding a value which could damage the silicon controlled switch 42. Thus, the diodes 53 and 59 protect the silicon controlled switch 42 from excessive voltage excursions. The resistors 51 and 52 form with the capacitor 48 a network which prevents high-frequency signals not shunted by the diodes 53 and 59 from either damaging or triggering falsely the silicon controlled switch 42.

The voltage needed to turn the silicon controlled switch on is related to the sensitivity of the circuit, and may be manually adjusted by the variable resistor 57 and temperature compensated by the thermistor 58 since the cathode gate to cathode voltage required to turn the silicon controlled switch on decreases as the temperature increases. Since the silicon controlled switch reacts very quickly, the load is disconnected before any damage can be done.

Provision is made in the present apparatus for detecting the presence of a ground 62 of the neutral conductor 6 at or near the load 9. Such a ground 62 does not exist in the normal case, but one can easily occur as where an appliance, wired with its metal jacket attached to the neutral conductor, connects to a water or gas pipe or touches any grounded surface. When such a ground 62 does occur, the ability of the circuit to detect a fault, by which current passes to ground through a shock or a dangerous leakage, is severely limited and the circuit may be rendered inoperative since a ground 62 together with the ground 8 provides a path for current to return to the source from the load while by-passing the primary 12 of the differential transformer 11; further, this is a low impedance path which tends to short circuit the transformer 11. The circuit breaker 17 may thus be opened when the load is operating normally since only a portion of the current returning to the source need travel through the differential transformer. More important, a ground 62 provides a path by which some of the current passing to ground from the electrified conductor through a fault, such as a shock or fire causing leakage, may pass back to the source through the primary 12, thus decreasing the sensitivity and protective value of the circuit. Means for detecting such a grounding 62 of the neutral conductor at the load and for opening the circuit breaker is provided by the connection of the neutral conductor 6 with the tertiary winding 39 of the power transformer 22. A current is thus induced in the neutral conductor which may pass to ground through the ground 62, back into the neutral conductor at the ground 8 and through the primary 12 of the differential transformer. This current is too small to be dangerous or to upset the proper functioning of the load, but it is large enough to cause the circuit breaker to be opened in the same manner as indicated above when an inadvertent ground is present. The ground 62 may then be located and corrected.

FIGURE 2

The circuit of FIGURE 2 is similar to that in FIGURE 1 except that certain alterations are made to adapt it to portable use and temporary installation. Similar numbers will be used where applicable.

When a device is plugged into an electrical outlet (not shown) by a plug 63, it is not known which of the two conductors 64 and 66 will be attached to the conductor of the supply (not shown) which is grounded or neutral and which of the two conductors will become electrified. Thus it is necessary that the two conductors be symmetrically treated, unlike the situation in FIGURE 1. For purposes of description the conductor 64 is shown to be connected to the grounded conductor of the supply, as indicated by the ground 67, but it is apparent that the circuit will work in exactly the same way if the plug 63 is reversed in its socket. Similarly, the appliance or load (not shown) which is plugged into the socket 68 may be plugged in with its plug facing either way and the circuit of FIGURE 2 will act equally well.

The differential transformer 11 of FIGURE 2 is just the same as that in FIGURE 1, having two primaries 12 and 13 through which the conductors 64 and 66 pass and a secondary 14 having sides 27 and 49. The circuit breaker 69, however, now has three contact bars 71, 72 and 73 so that each of the conductors 64 and 66 and another conductor 74 to the primary 76 of the power transformer 77 may be interrupted thereby. Furthermore, the circuit breaker is designed so that when the contact bars 71, 72 and 73 thereof are manually closed by the push button 78, the contact bar 73 through which the conductor 74 passes closes at least as early as the first to close of the other two contact bars 71 and 72, as indicated in the drawing by the shorter distance needed to close the contact bar 73. The network 16 is thus operative when either of the conductors 64 and 66 is connected. The circuit breaker is opened by a coil 79 as before.

The power transformer 77 also differs from that in FIGURE 1 in that it has three windings 82, 83 and 84. The secondary 82 is as in FIGURE 1, having a center-tap 86 connected to one side 27 of the differential transformer 11 to form a common terminal 28 and two sides 87 and 88 connected to the network 16 to supply power thereto. The other two windings 83 and 84 are identical with each other, with one of the conductors 64 and 66 connected to each.

The network 16 is identical to that in FIGURE 1.

OPERATION OF FIGURE 2

The operation of FIGURE 2 is just the same as that of FIGURE 1 except that both conductors 64 and 66 are interrupted by the circuit breaker 69, both conductors have small alternating voltages induced therein by the two windings 83 and 84 of the power transformer 81, and the power to the network 16 is also switched by the circuit breaker. Thus no matter which of the conductors 64 and 66 is electrified by the source, it will be interrupted by the circuit breaker, and no matter which of the conductors 64 and 66 is grounded at the source, as shown at 67, it will have a small alternating current induced therein for detection of a ground at the load, as indicated at 89. The power to the network 16 is switched by the circuit breaker so that the network 16 must be operating whenever the one of the contact bars 71 and 72 on the electrified conductor is closed.

What is claimed is:

1. Circuit breaking apparatus for insertion in a circuit between an alternating current supply and an electrical load, said circuit having a neutral, electrically grounded conductor and an electrified conductor which comprises a circuit breaker, means for connecting said circuit breaker between said supply and said load to interrupt said electrified conductor, means for sensing a difference between the electrical current passing into said load through said conductors and the electrical current passing out of said load through said conductors, means responsive to said sensing means for operating said circuit breaker, means responsive to current flow between said conductors for establishing a magnetic flux, and means responsive to said flux for producing a current in said neutral conductor of sufficient magnitude to operate said circuit breaker when said neutral conductor is grounded at or near said load.

2. The circuit breaking apparatus of claim 1 in which said flux produced current is an alternating current, said sensing means is a differential transformer having a conductor from said source connected to a primary thereof, said circuit breaker operating means is connected for response to a current in the secondary of said differential transformer, and means are provided for making said flux produced alternating current effective upon said differential transformer.

3. The circuit breaking apparatus of claim 1 which also includes a power transformer for operating said circuit breaker, means for connecting the primary of said power transformer to said source and in which said means for providing a small alternating current includes a tertiary winding of said power transformer.

4. The circuit breaking apparatus of claim 3 in which said neutral conductor becomes a winding of said power transformer between said source and said load.

5. The circuit breaking apparatus of claim 4 in which said power transformer has a core with an opening therethrough and said neutral conductor passes through said opening.

6. The circuit breaking apparatus of claim 4 in which all of said conductors go through the winding window of said power transformer.

7. The circuit breaking apparatus of claim 3 in which an inductor winding in said power transformer is included in said neutral conductor.

References Cited

UNITED STATES PATENTS

| 3,019,373 | 1/1962 | Kramer | 317—18 XR |
|---|---|---|---|
| 3,214,638 | 10/1965 | Mosler et al. | 317—18 |
| 3,252,052 | 5/1966 | Nash | 317—18 |
| 3,296,493 | 1/1967 | Whittaker et al. | 317—27 XR |
| 3,356,939 | 12/1967 | Stevenson | 317—18 XR |
| 3,376,477 | 4/1968 | Weinger | 317—18 XR |
| 3,407,337 | 10/1968 | Benham | 317—18 |

W. M. SHOOP, JR., Primary Examiner

U.S. Cl. X.R.

317—27